United States Patent
Roger

[15] 3,674,095
[45] July 4, 1972

[54] SERVO-CONTROL FOR AN AGRICULTURAL TRACTOR HYDRAULIC LIFT

[72] Inventor: John Nelson Roger, Cedar Falls, Iowa
[73] Assignee: Deere & Company, Moline, Ill.
[22] Filed: Oct. 26, 1970
[21] Appl. No.: 83,940

[52] U.S. Cl. ............................172/7, 251/294, 172/444
[51] Int. Cl. .................................................A01b 63/112
[58] Field of Search..............172/2, 7, 9, 11, 239, 465; 74/501; 251/294

[56] References Cited

UNITED STATES PATENTS

| | | | |
|---|---|---|---|
| 2,974,733 | 3/1961 | Fletcher | 172/7 |
| 3,172,479 | 3/1965 | Ashfield et al. | 172/7 |
| 3,167,133 | 1/1965 | Annat | 172/7 |
| 3,368,630 | 2/1968 | Andrews | 172/7 |
| 2,515,395 | 7/1950 | Court | 172/9 |
| 2,864,295 | 12/1958 | Du Shane | 172/9 |
| 2,920,705 | 1/1960 | Du Shane | 172/9 |
| 2,921,638 | 1/1960 | Du Shane | 172/9 |
| 2,764,393 | 9/1956 | Geyer | 251/294 X |
| 1,628,506 | 5/1927 | Lyman | 251/294 X |

FOREIGN PATENTS OR APPLICATIONS

| | | | |
|---|---|---|---|
| 230,662 | 12/1963 | Austria | 172/7 |

*Primary Examiner*—Robert E. Pulfrey
*Assistant Examiner*—R. T. Rader
*Attorney*—H. Vincent Harsha, Harold M. Knoth, William A. Murray, John M. Nolan and Jimmie R. Oaks

[57] ABSTRACT

A cable and sheave (or equivalent) system for operating the valve means of a tractor hydraulic lift to regulate the position of the associated implement according to (a) load or draft, (b) depth or position and (c) a combination or "mixture" of (a) and (b).

21 Claims, 8 Drawing Figures

PATENTED JUL 4 1972

INVENTOR
R. J. NELSON

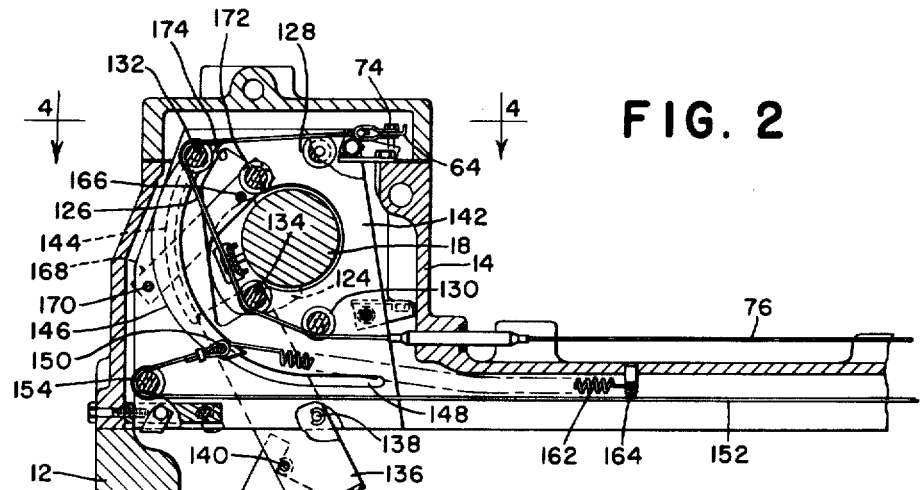
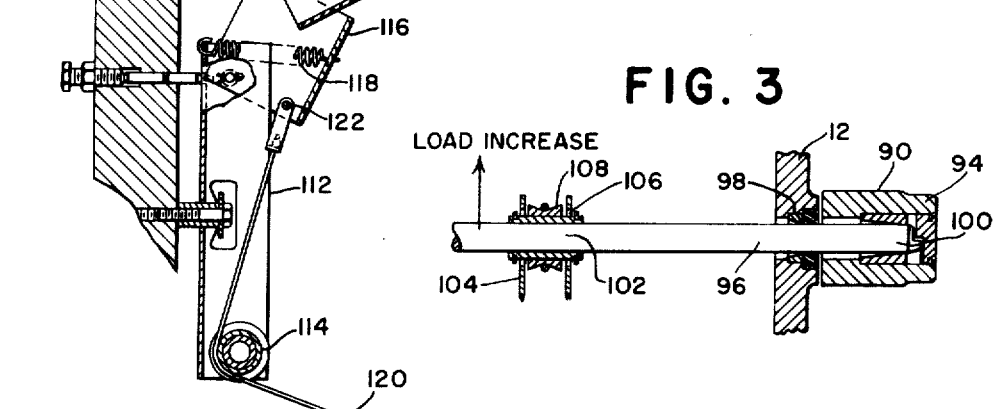
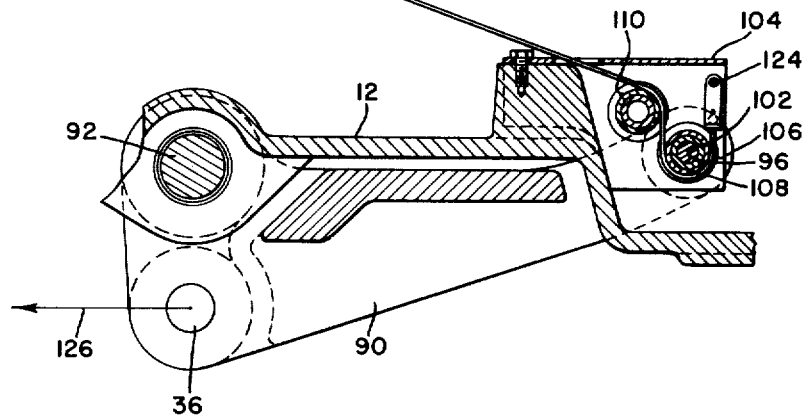

INVENTOR.
R. J. NELSON

SERVO-CONTROL FOR AN AGRICULTURAL TRACTOR HYDRAULIC LIFT

BACKGROUND OF THE INVENTION

The so-called Ferguson system is an example of load or draft control of implements associated with a tractor and positioned by a hydraulic lift, wherein the position of the implement—e.g. a plow—changes by a "balance" among implement draft, a load spring, and the initial manual setting of the valve. The servo system in a position-control arrangement responds rather to the position of the implement by a signal from the rockshaft to which the implement is connected. If is commonplace to combine the two systems for optional operation. See for example U.S. Pat. No. 2,721,508, granted to J. H. Edman on 25 Oct. 1955 (Canadian Pat. No. 530,780 of 25 Sept. 1956). In a further development, the two systems have not only been made optional but may be combined or "mixed" to provide the benefits and advantages of the two where conditions require. This is best exemplified by U.S. Pat. No. 2,864,295 granted to W. H. DuShane on 16 Dec. 1958 (Canadian Pat. No. 596,295 of 26 Apr. 1960).

These and other known systems rely, fundamentally, on interconnecting the valve means and the manual control by mechanical linkage and then feeding into linkage a signal or response from (a) draft forces or (b) implement position, and, (c) in the case of the above DuShane patent, a combination of (a) and (b), so that the valve means, initially set by the manual control (hand lever) and returned to neutral by (a), (b) or (c), will change to activate the hydraulic lift cylinder when any one of the foregoing three inputs is fed into the servo by implement changes during operation. For example, in a simple position or depth control situation, the operator selects a depth and the valve means causes actuation of the lift cylinder until the implement reaches that depth, at which time a member movable with the implement—usually the lift rockshaft—acts on the valve means to return it to neutral. Likewise, in a draft-control situation, the plow operates at the preselected depth until draft forces change and signal the valve for a change of position.

One disadvantage of a link and lever system is that considerable accuracy is required—or compensation must otherwise be made—because of the many pivots involved. Lost motion can have a serious effect on responses, which may be delayed, premature or otherwise faulty. Further, such linkages are expensive to manufacture, maintain and adjust. Also, systems of this type are commonly built into the tractor along with the tractor transmission, and space is at a premium, requiring complicated and expensive configurations of levers, links, cams, etc.

SUMMARY OF THE INVENTION

According to the present invention, these disadvantage are eliminated and certain additional benefits are achieved, especially by the use of a flexible member such as a cable, band, etc. and associated sheaves, rollers, etc. Some of these sheaves are used as idlers or guides and a pair are used, separately and/or in conjunction, to act on the cable according to whether the signal is fed to one or the other of them, or to both of them, by draft or load changes, by positioned changes or by a combination of both draft and position. The cable and sheave system is materially less costly, involves little or no lost motion and, because of the flexibility of the cable, may be readily configured to accommodate the rockshaft position and otherwise to use advantageously the limited spaced usually available.

BRIEF DESCRIPTION OF THE DRAWINGS

FIG. 2 is an enlarged sectional view of the improved servo system, with the parts shown in a condition corresponding to load or draft control, the lift system fully lowered and operating in a high-draft situation.

FIG. 3 is a section, on an enlarged scale, as seen along the line 3—3 of FIG. 1.

DESCRIPTION OF THE PREFERRED EMBODIMENT

Figure 4:
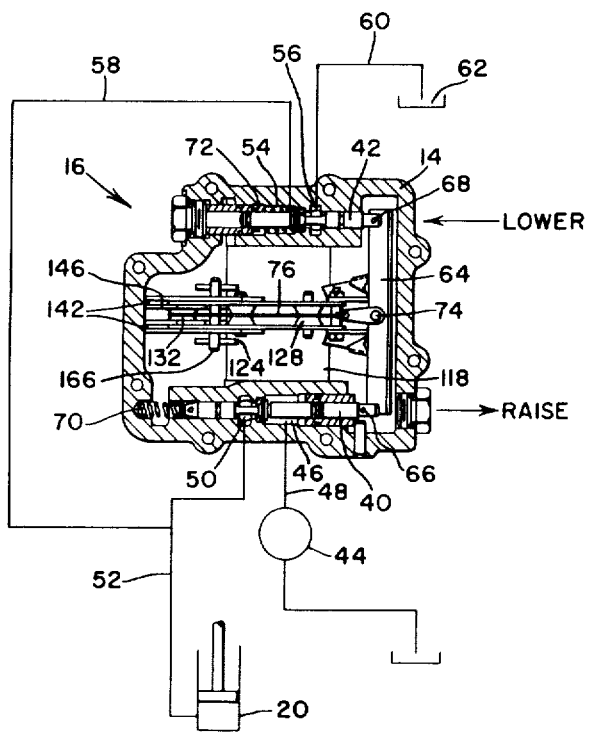
FIG. 4 is a section of the valve means as seen along the line 4—4 of FIG. 2.

A tractor 10 has a rear body portion or transmission case 12, over which is superimposed a housing 14 carrying valve means 16 (FIG. 4) and a transverse rockshaft 18 powered by a hydraulic cylinder 20 connected between a support 22 on the tractor and an arm 24 keyed to the rockshaft. A hitch 26, which may be accepted here as representative of a tractor-associated implement, has an implement-receiving element or coupler 28 carried by a pair of lower draft links 30 and a top link 32. The top link is conventionally pivoted to the tractor at 34 and the lower links are pivoted to the tractor at 36. It will be understood that there are two transversely spaced apart lift arms 24 connected to the rockshaft 18 and each of these is connected by a lift link 38 to its respective lower link 30, so that fluid supplied to extend the lift or rockshaft cylinder 20 raises the hitch 26 (and its associated implement), and, conversely, when the cylinder is exhausted, the hitch and implement descend.

In the example shown, the valve means 16 includes a raising valve 40 and a lowering valve 42, both of the poppet type. A pump 44 supplies fluid under pressure to a valve chamber 46 for the raising valve 40 via a line 48, and, when the valve 40 is moved to the right, fluid pressure acts through an associated chamber 50 and line 52 to extend the cylinder 20. The lowering valve 42 operates to control communication between two chambers 54 and 56, the former leading from the cylinder 20 via a line 58 and the line 52, and the latter leading via a line 60 to reservoir as at 62. Thus, when the lowering valve is moved to the left, the chambers 54 and 56 are in communication and fluid is exhausted from the cylinder 20 along the path 52–58–54–56–60–62. The two valves are cross-connected by a beam or bar 64 having pivotal connections 66 and 68 at opposite ends with the valves so that each valve is operative independently of the other. The valve means per se is merely representative and any other valve means could be used.

Figure 1:
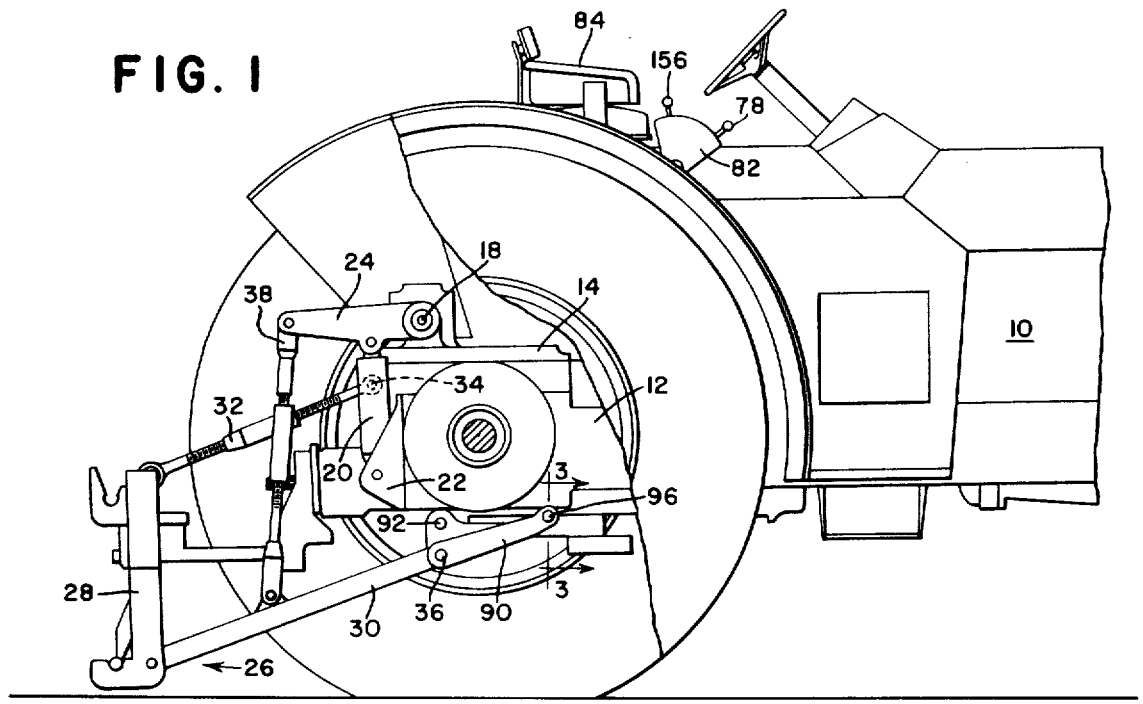
FIG. 1 is a fragmentary view of the rear portion of a typical tractor, with portion broken away to expose the significant hitch and lift parts.
Figure 8:
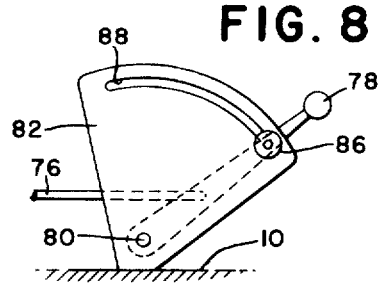
FIG. 8 is likewise a schematic view and shows a representative manual lever for selectively setting the valve means initially.

The raising valve 40 is spring-loaded at 70 to opened position and the lower valve 42 is spring-loaded at 72 to closed position, as will be explained subsequently in greater detail, and the beam or bar 64 is connected intermediate its ends at 74 to a cable or equivalent flexible element 76, the other end of which is connected to a selectively settable manual means such a control lever 78 rockable about a pivot 80 on a quadrant 82 fixed to the tractor 10 adjacent to an operator's station 84. A selected position of the lever 78 is retained by a conventional friction device 86 operative through the range of an arcuate slot 88 (FIG. 8). At this point, suffice it to say that, when the lever 78 is fully forward, as shown in FIGS. 1 and 8, the cylinder 20 is fully exhausted and the hitch 26 is fully lowered, because the valve 42 has been moved to the left to opened position as tension on the cable 76 has caused the beam 64 to swing counterclockwise about its pivot 66 to the valve 40, it being seen that tension on the cable likewise keeps the valve 40 closed or to the left and acts thus against the opening spring 70.

Conversely, when the lever 78 is moved rearwardly, tension on the cable 76 is relaxed and the spring 70 acts to open the valve 40, thus pivoting the beam 64 counterclockwise about its pivot 68 with the valve 42, the spring 72 of course keeping the valve 42 closed. These details will be elaborated later when the cable servo is described. For the moment, it should be observed that the manual control 78 is one input or signal to the servo system.

As described above, the draft links are pivoted to the tractor at 36. This pivot means includes a bell crank 90 for each draft link, and each bell crank is pivoted at 92 to the lower part of the tractor transmission case 12 and includes a forward arm sleeved at 94 over the proximate end of a transverse draft spring 96 of the type forming the subject matter of the U.S. Pat. No. 2,940,530 granted to W. H. DuShane on 14 June 1960. In substance, the spring 96 is a resilient bar fulcrumed at opposite ends at 98 in the transmission case side walls, it being understood that FIG. 3 shows only one half of the construction but that it is symmetrical at both sides. Each end 100 of the bar laterally overhangs its fulcrum 98 and receives the associated sleeve 94 of the bell crank 90. As draft forces are imposed tensionally—rearwardly in the present case—on the draft links 30, the bell cranks 90 rock clockwise so that their forward arms move downwardly, tending to bend the overhanging ends 100 of the bar or spring 96 downwardly. This results in a deflection upwardly of a midportion 102 of the bar 96.

The transmission case 12 carries a bracket 104 having an opening 106 through which the bar 96 loosely passes so as not to be inhibited by the bracket. The bracket is double-walled (FIG. 3) to confine a rotatable member or sheave 108 journaled on the midportion 102 of the bar 96. The bracket 104 also journals a second sheave or roller 110 in proximity to the sheave 108. A further bracket or mount 112 is carried by the case 12 and journals a sheave 114 and pivotally mounts an arm 116 that is biased by a spring 118 to move in a counterclockwise direction. A cable or similar flexible element 120 is connected at 122 to the arm 116 and trains about the sheaves 114, 110 and 108 and is finally anchored at 124 to the bracket 104.

As a consequence, when draft forces increase, as by increased tension in the lower draft links 30 (arrow 126 in FIG. 2), the outer ends 100 of the draft bar 96 deflect downwardly and the mid-portion 102 deflects upwardly, relaxing tension on the cable 120 so that the spring 118 rocks the arm 116 rearwardly or counterclockwise and, as will be elaborated below, provides a second input or signal to the valve means 16.

The rockshaft 18, which reflects implement or hitch position, provides a third input or signal to the valve means 16, and this is accomplished, representatively here, by a cam 124 fixed to the rockshaft, so that, as the angular position of the rock-shaft changes—equivalent to vertical changes in the position of the hitch 26—compensating changes or signals are fed into the valve means 16 via the cable 76.

The three inputs to the valve means 16—namely, the manual input 78, the position or depth input 124 and the load or draft input 102—act through the cable 76. Basically, the manual input sets or determines the length of cable available to be influenced by 102 or 124 or both; that is, the cable 76 may be regarded as being connected at one end to the valve means—e.g. at 74—and at its other end to the hand lever 78. It will be clear that if the cable is deflected intermediate the connections, and assuming that the connection at 78 is fixed via the friction device 86, the valve means will be operated and the cylinder 20 will function to raise or lower the hitch 26, as the case may be, and the valve means will be restored to neutral when the change is accommodated; for example, when a new depth, load or position are attained.

FIG. 2, for example, illustrates the compactness of the system, major components of which are contained in the upper rear portion of the housing 14 through which the rockshaft 18 extends. The cable 76, in that portion thereof within the housing has the configuration of a bright or loop 126 that loosely passes around the rockshaft, being guided by upper and lower fixed sheaves or rollers 128 and 130, respectively, and further being trained about upper and lower shiftable sheaves or rollers 132 and 134, respectively. The lower sheave 134 is carried by the upper end of a lever 136 that is pivoted at 138 in a lower part of the housing 14 and that has its lower end engaged at 140 with the upper end of the arm 116 that responds to changes in draft via the lower cable 120 and draft bar or spring 96, so that rocking of the lever 136 in response to changes in draft causes the sheave 134 to act on the control cable 76 and thus to operate the valve means 16 when the parts are in their FIG. 2 condition. As will be seen subsequently, the relationship between the cable 76 and sheave 134 can be changed so that rocking of the draft responder lever 136 has no effect on the cable.

Figure 5:
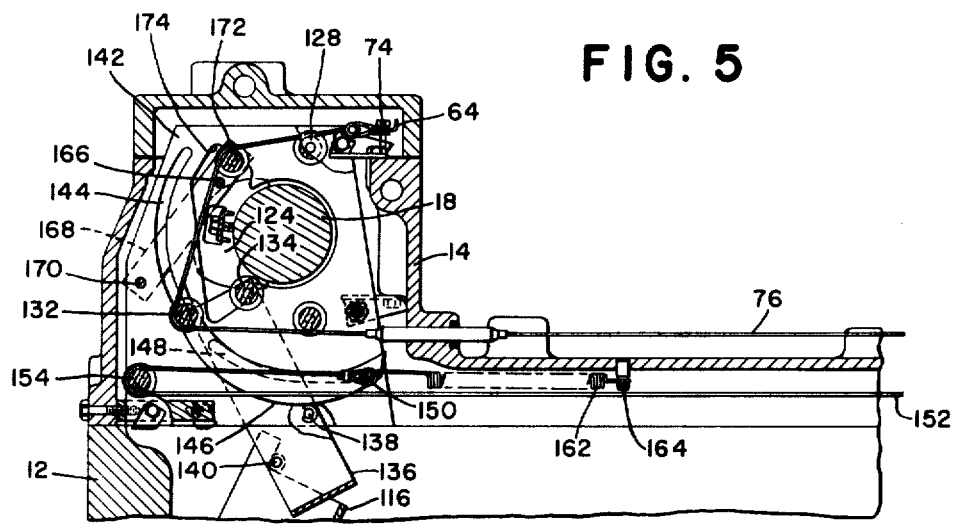
FIG. 5 is a view similar to FIG. 2, but with parts of FIG. 2 omitted and showing position control in an almost fully lowered condition.
Figure 6:
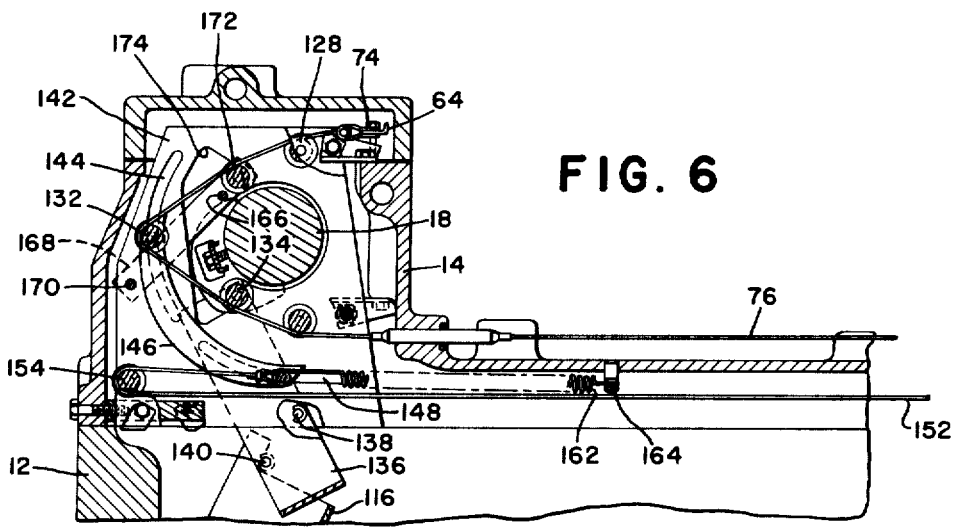
FIG. 6 is a similar view but shows the parts in a "mixed" condition.
Figure 7:
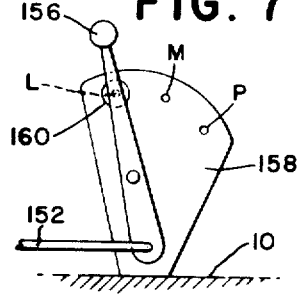
FIG. 7 is a schematic view of a typical manual control for selecting among the three conditions.

The sheaves 128, 130, 132 and 134 are journaled between a pair of upright plates 142 fixed within the housing 14 and having transversely matched arcuate slots 144 within which the upper sheave 132 is guided as it is selectively shifted between its upper position of FIG. 2, its lower position of FIG. 5 and its intermediate position of FIG. 6. An arcuate link 146 is connected at its upper end to the sheave 132 and is guided at its lower end for travel back and forth in a lower slot 148 in each plate 142. A pin 150, connected to the link 146 and passing through the slot 148, provides a connection for one end of a selector cable 152 that passes around a fixed sheave or guide 154 and then extends forwardly to a connection with a selector control lever 156 (FIGS. 1 and 7) pivoted on a quadrant 158 mounted on the tractor adjacent to the raise-lower lever 78. The quadrant 158 has three notches or the like at L, M and P, at any one of which the lever 156 may be selectively set by any releasable locking device such as indicated at 160. As shown, the lever 156 is in its "L" position to correspond with the "load" setting of FIG. 2. That is, the valve means 16 will respond to changes in draft or load imposed on the draft links 30 by an implement connected to the hitch 26.

A spring 162 is connected at its forward end to the housing 14 at 164 and at its rear end to the pin 150 and biases the pin, and thus the link 146, forwardly in the lower slot 148, but this movement is normally prevented because the selector lever 156 is locked in its "L" position. Thus the sheave 132 remains in its upper position in its slots 144 as shown in FIG. 2.

Input to the servo in response to implement or hitch position is derived from the rockshaft cam 124 and an associated cam follower or pin 166 carried by an arm 168. This arm is pivoted at 170 between the plates 142 and carries a sheave or roller 172 at its free or upper end. As the rockshaft rocks, the cam 124 acts through the follower 166 to rock the arm 168 and thus to change the position of the sheave 172. In the FIG. 2 condition, which represents load or draft control, the upper reach of the cable 76 between the sheaves 128 and 132 is held away from the sheave 172 and therefore, even though the sheave 172 moves as the arm 168 rocks, it has no effect on the cable. In FIG. 5, however (position or depth control), the sheave 132 has been moved to the bottom of the slot 144 as the selector lever 156 has been moved to its "P" position, and the cable now passes over the position control sheave 172 to be influenced by movement of that sheave as the pin 166 follows rockshaft cam 124. At the same time that the sheave 132 is moved to the bottom of the slot 144, the cable 76 is drawn away from the load control sheave 134 and thus movement of the latter in response to changes in draft or load has no effect on the cable 76.

In FIG. 6—mixed or combined control—, the sheave 132 is in an intermediate position in the slot 144 and the cable 76 rides on both sheaves 172 and 134, whereby the valve means 16 is influenced by a combination of inputs, giving the advantages pointed out in the above-mentioned U.S. Pat. to DuShane, No. 2,864,295.

It should be observed that the plates 142 are further cut out at 174 to accommodate transverse parts, such as 166, etc.

Operation: As already described, FIG. 2 shows the system set for load or draft control and it is assumed that substantial load is being encountered. The lever 78 is in its lowered position and the selector lever 156 is in its "L" position. When an increased load is sensed, the result is that the valve means 16 is operated automatically to raise the hitch 26 and implement until the load reaches its pre-set value. An increase in load or draft tensions the draft links 30, causing the bell cranks 90 to turn clockwise, thus exerting a downward force on the laterally overhanging ends 100 of the draft bar 96, followed by upward deflection of the midportion 102 of the bar. The spring 118 turns the arm 116 counterclockwise, allowing the lever 136 to turn clockwise. This in turn means that the sheave 134 moves upwardly and forwardly as the spring 70 behind the raise valve 40 moves that valve forwardly to raise position, the beam 64 of course pivoting about its connection 68 with the now stationary lower valve 42. In short, the cable 76 in its stretch between the sheaves 130 and 132 is relaxed but the relaxation is immediately taken up as the cable is retensioned by means of the valve spring 70. As the valve 40 opens, the valve chambers 46 and 50 are connected and the pump 44 pressurizes the lift cylinder via line 52 to turn the rockshaft 18 clockwise and thus to raise the hitch.

When the draft returns to its pre-set value, the midportion of the bar 96 returns to it previous position, thus exerting a tensional force on the cable 120 so as to rock the arm 116 clockwise, followed by counterclockwise turning of the lever 136 and retensioning of the cable 76 as the sheave 134 moves rearwardly, resulting in rearward or closing movement of the raise valve 40. Considering the two valves 40 and 42 in the sense of a spool or similar valve, the condition obtaining when both valves are closed is a neutral condition.

If the draft or load decreases below the pre-set value, the opposite from the above will occur; that is, the lower valve 42 will open, because decrease in load means that the midportion 102 of the bar 96 tends to move downwardly, tensioning the cable 120 and acting through the arm 116 and lever 136 to swing the sheave 134 rearwardly. This of course tensions the cable 76 and exerts a force on the valve beam 64 so that the beam swings about its pivot 66 to the now stationary raise valve 40, whereupon the lower valve 42 is forced rearwardly against its spring 72 so that the chambers 54 and 56 are in communication and fluid may flow from the cylinder to reservoir via 52, 58, 54, 56 and 60.

All foregoing takes place without any influence on the system from the position control sheave 172, because, as seen in FIG. 2, this sheave is out of reach of the cable 76.

When the system is set for position control, the selector 156 is moved by the operator to its "P" position, and the lever 78 is moved to a selected forward or "lower" position. This results in setting of the sheave 132 at the lower ends of the slots 144 as in FIG. 5, which means that the cable 76 now rides on the position control sheave 172 so as to be influenced thereby as the cam follower 166 follows the rockshaft cam to rock the arm 168. The cable 76, as thus influenced, operates the valve means 16 to raise or lower the hitch, as the case may be. For example, the operator moves the lever 78 to a selected lower position, opening the lower valve 42 to exhaust the cylinder 20 as the hitch descends. This of course operates to turn the rockshaft 18 in a counterclockwise direction, followed by the pin 166 so that the sheave 172 moves downwardly. The portion of the cable 76 between the sheaves 128 and 132 and over the sheave 172 is relaxed, and the spring 72 behind the lower valve 42 forces that valve to close when the preselected position is achieved. Just the opposite occurs of course when the lever 78 is moved to "raise" position, which opens the raise valve 40 until that valve returns to its closed position as the sheave 172 moves upwardly in response to clockwise rocking of the rockshaft 18, thus tensioning the cable 76 and moving the valve 40 back to its closed position.

Mixed or combination control is effected when the selector 156 is set in its "M" position, relaxing the cable 152 so that the spring 162 can draw the pin 150 forwardly to an intermediate position in the slot 148, followed by downward movement of the link 146 so that the sheave 132 also occupies an intermediate position in its slot 144. As seen in FIG. 6, the bight 126 of the cable 76 rides both sheaves 172 and 132 and the control partakes of both draft and position signals as described in the above Dushane patent, U.S.

I claim:

1. A tractor hydraulic lift system for adjusting an associated implement and including a hydraulic actuator for raising, lowering and holding the implement, valve means movable from a neutral position to raise and lower positions for controlling the actuator, selectively settable manual means for operating the valve means, implement-responsive means for operating the valve means and servo means cooperative among the valve means, the implement responsive means and the manual means characterized in that the servo means includes a flexible element connected at opposite ends to the valve means and manual means for predetermined tensioning between the neutrally positioned valve means and a selected position of the manual means and engageable intermediate said ends by a movable guide of the implement-responsive means to vary said tensioning to move the valve means out of and back to its neutral position.

2. The invention defined in claim 1 in which the implement-responsive means is an element movable in response to implement position.

3. The invention defined in claim 1 in which the implement-responsive means is an element movable in response to variations in draft forces imposed between the implement and tractor.

4. The invention defined in claim 1 in which the implement-responsive means includes a first element movable in response to implement position and a second element responsive to variations in draft forces imposed between the implement and tractor, and selector means is provided for optionally selecting which element is to be effective in varying the tensioning in the flexible element.

5. The invention defined in claim 4 in which the selector means is further operative to cause both elements to be effective in varying the tensioning in the flexible element.

6. The invention defined in claim 1 further characterized in that the valve means includes first and second spaced apart valve members arranged in side-by-side parallel relationship, the first valve member being biased to open and the second valve member being biased to close an operating member spans and is pivotally connected at its opposite ends to the valve members, the members flexible member is connected at one end to a midportion of the operating member and at its other end to the settable means for predetermined tensioning to keep both valve members closed so that, upon relaxation of said tensioning by the implement-responsive means the first valve opens under influence by its bias and, upon increase of said tensioning by the implement-responsive means the second valve opens against its bias.

7. The invention defined in claim 6 in which said valve members are of the poppet type.

8. The invention defined in claim 6 including guide means about which the flexible element is trained to provide a bight portion in said element, and said implement-responsive means engaging said bight portion.

9. The invention defined in claim 1 including a second implement-responsive means also engageable with said element intermediate its ends to vary said tensioning to move the valve means out of and back to i neutral position.

10. The invention defined in claim 9 including selector means for conditioning either implement-responsive means to engage the element exclusively of the other implement-responsive means.

11. The invention defined in claim 10 in which the selector means is operative to condition both implement-responsive means for engagement with said element.

12. In a hydraulic lift for a tractor having a fore-and-aft body including a housing, a hitch system having a transverse lift rockshaft rockable in the housing, a hydraulic motor for rocking the rockshaft, motor-controlling valve means in the housing spaced from the rockshaft in a first direction and selectively settable means for the valve means spaced from the rockshaft in a second direction, the improvement residing in means interconnecting the valve means and the settable means, comprising a flexible element connected at one end to the valve means, and having a bight looped loosely around the rockshaft to extend away from the settable means and then toward and connected at its other end to the settable means, a plurality of guides engaging the bight to retain it free of the rockshaft, and one of said guides being movable in response to rocking of the rockshaft to engage the bight for varying the tension in the flexible element.

13. The invention defined in claim 12, in which the hitch system includes a part responsive to variations in draft forces and one of the guides is movable in response to draft forces imposed on the hitch to engage the bight for varying the tension in the flexible element.

14. The invention defined in claim 12 in which one of the guides is movable in response to rocking of the rockshaft to engage the bight for varying the tension in the flexible element, the hitch system includes a part responsive to variations in draft forces, and another of the guides is movable in response to draft forces imposed on the hitch to engage the bight for varying the tension in the flexible element.

15. The invention defined in claim 1 in which one of the guides is movable in response to rocking of the rockshaft to engage the bight for varying the tension in the flexible element, the hitch system includes a part responsive to variations in draft forces, and another of the guides is movable in response to draft forces imposed on the hitch to engage the bight for varying the tension in the flexible element, and selector means is operative to selectively disengage either the first or second guide from the bight of the flexible element.

16. The invention defined in claim 15 in which the selector means is operative to engage both the first and second guides said bight.

17. The invention defined in claim 1 in which a pair of transversely spaced apart supports embrace the rockshaft and the guides are carried by and between the supports.

18. The invention defined in claim 17 in which the supports are provided with cooperative side-by-side slots and one of the guides is selectively movable in the slots.

19. The invention defined in claim 17 in which the supports are provided with a swingable arm and one of the guides is carried by the arm for movement therewith and means is provided for moving the arm.

20. The invention defined in claim 19 in which the means for moving the arm includes an element movable in response to rocking of the rockshaft.

21. The invention defined in claim 19 in which the tractor includes a hitch responsive to variations in draft forces and the means for moving the arm includes an element movable in response to movement of the hitch.

* * * * *

UNITED STATES PATENT OFFICE
CERTIFICATE OF CORRECTION

Patent No. 3,674,095          Dated 4 July 1972

Inventor(s) Roger John Nelson

It is certified that error appears in the above-identified patent and that said Letters Patent are hereby corrected as shown below:

Title page at "[72]" change inventor to -- Roger John Nelson --.

Column 6, line 58, after "to" change "i" to -- its --.

Column 7, line 20, after "claim" change "1" to -- 12 --.

Column 8, line 5, after "guides" insert -- with --; line 7, after "claim" change "1" to -- 12 --.

Signed and sealed this 6th day of March 1973.

(SEAL)
Attest:

EDWARD M. FLETCHER, JR.         ROBERT GOTTSCHALK
Attesting Officer               Commissioner of Patents